Sept. 21, 1965     M. J. MAJOR     3,207,231
ROTARY CULTIVATOR
Filed Oct. 14, 1963     2 Sheets-Sheet 1
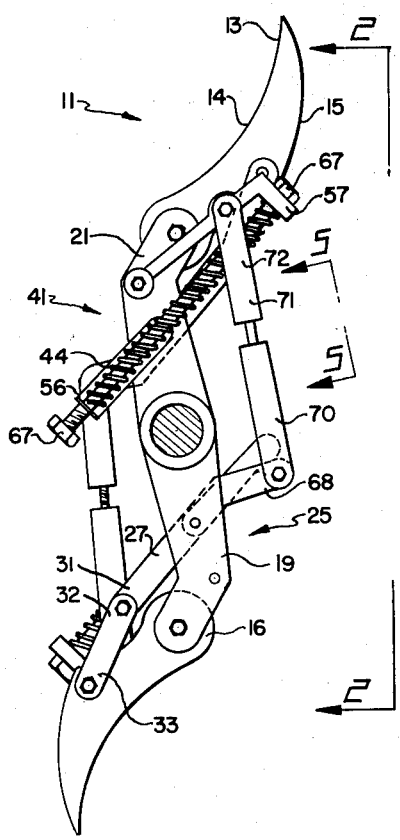
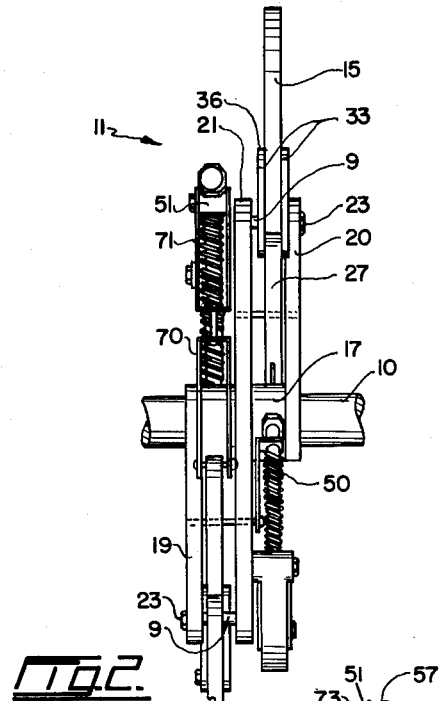
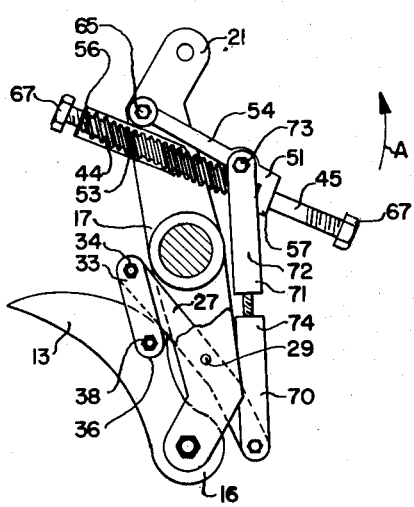
INVENTOR
MEDERIC J. MAJOR
BY
ATTORNEYS

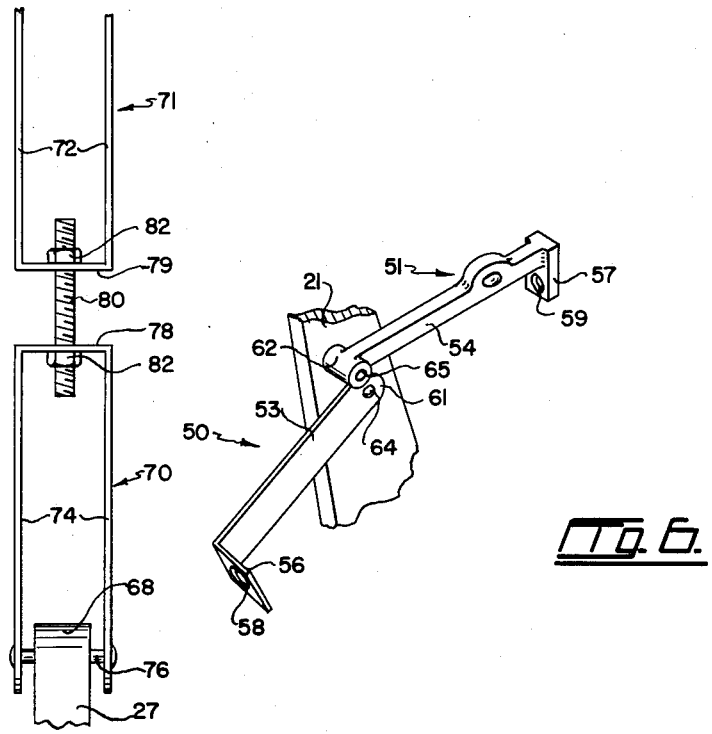

United States Patent Office 3,207,231
Patented Sept. 21, 1965

3,207,231
ROTARY CULTIVATOR
Mederic J. Major, 1218 Hammond Ave., New
Westminster, British Columbia, Canada
Filed Oct. 14, 1963, Ser. No. 315,923
6 Claims. (Cl. 172—96)

This invention relates to rotary tillers adapted for tilling, digging, and otherwise pulverizing or comminuting soils, sands and other like materials.

In the operation of a rotary tiller, digging tools are usually fastened to a rotatable shaft which in itself is supported horizontally on a suitable carriage, the carriage either being drawn by a tractor or the like or self-powered to travel over the surface to be tilled. During the travel of the carriage, the shaft is rotated at a relatively high speed so that the speed of rotation of the digging tool mounted thereon is substantially greater than the forward speed of travel of the carriage. The earth or like material over which the rotary tiller is operated is therefore finely pulverized by the digging tools.

It will be appreciated that where the earth is rocky or filled with stumps, the digging tools will either break on meeting an obstruction or else lift the carriage and the other digging tools from the earth resulting therefor in an imperfect tilling job. Rotary tillers have heretofore been devised wherein the digging tools are mounted on the shaft in such a manner that they may, upon meeting an obstruction, fold inwardly upon the shaft against the action of a resilient means, such as a spring, to prevent breakage of the tools. The last-mentioned type of rotary tiller in general uses a compressible spring against which each tool is arranged to press as it folds backwardly towards the shaft, the resistance of the spring to said movement being greater as the tool moves closer to the shaft. This arrangement has not been too successful as the action of the spring must necessarily be fairly weak at its most extended position in order to permit relatively great extensive movement of the digging tool, and therefore offers little if any resistance to an obstructing body which should be removed. However, if the action of the spring is sufficient to prevent movement of the tool when meeting a small obstructing body, to move the latter, the inward force upon the tool when meeting a larger body would tend to lift the tool and the tilling unit off the tilling surface. This will consequently prevent the other digging tools mounted on the shaft from making contact with the ground and therefore leaving an untilled area.

The present invention overcomes the above problems by providing a rotary tiller in which the digging tool may fold backwardly towards the rotating shaft against the action of a spring which is so arranged that it offers steadily decreasing outward pressure against the tool as the tool moves from its extended position. This, therefore, prevents the digging tool from lifting the carriage upon which it is supported off the surface of the ground, permitting the other digging tools mounted along the shaft to till the soil in the proper fashion, and as the carriage is not lifted, the other digging tools on the shaft may reach around the obstruction body to strike one side or the bottom thereof, throwing the obstruction out of the ground and exposing it so that it may be disposed of.

The present invention comprising a rotatable member, a digging tool pivotally connected to the rotatable member and swingable between a normal radially extended position and a retracted position rearwardly therefrom, and resilient actuated linkage means connecting the rotatable member and the tool to urge the latter to its normal position, said means adapted to exert diminishing resistance to rearward pivotal movement of said tool as the latter is moved out of its normal position.

In the drawings which illustrate the embodiments of the invention,

FIGURE 1 is a side elevation of a set of digging tools of rotary tillers, in a plan normal to the axis of rotation thereof, the digging tools being shown in an extended position, FIGURE 2 is an end elevation of FIGURE 1 in the direction as shown by 2—2 of FIGURE 1, FIGURE 3 is a view similar to that of FIGURE 1, showing only one of the digger tools in the retracted position, FIGURE 4 is a view similar to FIGURE 3 showing the digger tool in an extended position, and FIGURES 5 and 6 are fragmentary views of portions of the device.

In the construction of rotary tillers, the tiller teeth are usually mounted on a rotatable shaft which is supported for rotation at either end thereof in suitable bearings and driven by any one of standard means. This method of construction is standard in all rotary tillers and will therefore not be described either in the drawings or the specification herein. In the drawings as shown in the figures hereinbefore mentioned, 10 designates a rotary shaft, which is driven in a standard manner as hereinbefore specified, and which is disposed horizontally over the surface of the ground or other material to be worked. The shaft carries, for rotation therewith, a plurality of concentrically disposed tilling units. One of the tilling units is shown in FIGURES 1 and 2 and is numbered 11 for purposes of identification.

Each tilling unit comprises a pair of digging tools 13, each mounted in a manner hereinafter described, diametrically opposite each other on each side of the shaft. Each of the digging tools 13 is arcuately or crescent shaped having a radially outer sharpened tooth portion 14 and an inner shank portion 15. Each of the digging tools 13 is arcuately or crescent shaped, the concave edge facing the direction of rotation of the tilling unit 11.

The means by which the digging tools are mounted, comprises a sleeve 17 having sufficient internal diameter to enable it to be slid lengthwise on the shaft 10 and secured against rotation thereto by means of a set screw tapped through the sleeve and arranged to bear on a suitably flattened portion of the shaft 10. A pair of arms 19 and 20 extend radially outwardly from each end of the sleeve in diametrically opposed directions, and mounted on said sleeve centrally thereof, is a central arm which extends radially outwardly on both sides of the sleeve and parallel to said arms 19 and 20. It will be seen by referring to FIGURE 2, that the centre arms 21 form, in conjunction with arms 19 and 20 respectively, a pair of diametrically opposed yokes in which each of the digging tools 13 are pivotally mounted near the end of each on the shaft portions 9 of pins or bolts 23, said bolts or pins being suitably secured between each of the arms 19 and 20 and the corresponding side of central arm 21, the longitudinal axes of the bolts lying parallel to the axis of the shaft.

By referring to FIGURE 1, it will be seen that each of the digging tools 13 is connected by a linking mechanism 25 to central arm 21. In the description following, reference will be made only to one digging tool and one set of linking mechanism as the digging tool and corresponding mechanism mounted in opposite relationship thereto is exactly the same. By referring to FIGURES 3 and 4 therefore, which show one digging tool 13 and its linking mechanism 25 secured to arm 20 and central arm 21, FIGURE 3 shows the digging tool 13 in its retracted or folded position in which said digging tool has swung upwardly towards the shaft 10 after striking an obstruction or the like. FIGURE 4 shows the digging tool 13 in its extended position in which position it is adapted to penetrate soil or earth or any like substances. The linking mechanism which is actuated upon the digging tools striking a rock or the like, comprises a rocker arm 27 pivotally mounted on a pin or bolt 29 which is secured between arm 20 and central arm 21 and having its axis parallel to the axis of the shaft 10. One end 31 of the rocker arm is pivotally secured between the ends 32 of a pair of spaced link members 33 by bolts or pins 34, the other end 36 of the linking members 33 are pivotally secured on each side of the digging tool 13 by bolts or pins 38 passing therethrough and through the shank portion of said digging tool near the trailing edge thereof. The rocker arm 27 is so arranged relative to the hub 16 of the digging tool that when the digging tool is extended to its most fully extended position, the rocker arm will contact the stop surface 40 formed on the hub 16 to thereby stop further pivotal movement of said rocker arm and to thereby limit the pivotal movement of the digging tool past an extended position. It should also be noted that with the digging tool 13 in its extended position, the linking members 33 and rocker arm 27 are positioned relative to each other so that they are almost, but not quite, aligned to thereby prevent the locking of the digging tool 13 in its extended position.

The digging tool 13 is spring-urged to its extended position as shown in FIGURES 1 and 4, by the operation of an actuating mechanism generally numbered 41.

The actuating mechanism 41 is carried on the centre arm 21 on that side thereof opposite the digging tool and comprises a compression spring 44 arranged on a shaft 45 to press outwardly against a pair of collar members 50 and 51 respectively, each of which is slidable on the shaft 45 and each of which is pivotally connected to the centre arm 21. Each of the collar members 50 and 51, as shown in FIGURE 6, is L-shaped, the legs 53 and 54 respectively thereof being substantially at right angles to the bases 56 and 57 respectively. Each of the bases 56 and 57 is provided with an aperture 58 and 59 respectively, said apertures being of sufficient size to permit the shaft 45 to be slidably received therein with a limited degree of lateral movement. The ends 61 and 62 of each of the legs 53 and 54, respectively, are pivotally connected to the centre arm 21 by pins or bolts 64 and 65 respectively, for pivotal movement in a plane normal to the axis of the shaft 10. The pins or bolts are located such that pin 65 is spaced inwardly from pin 64 towards the centre of the shaft. The various components of the actuating mechanism 41 as hereinbefore described are assembled relative to each other so that collar member 50 slidably embraces the shaft near one end thereof, whereas collar member 51 slidably embraces said shaft near the other end thereof, the spring 44 lying under compression therebetween and bearing on the inner faces of the bases 56 and 57. As the shaft is freely slidable within the apertures 58 and 59, nuts 67 are threaded on the ends thereof to bear against the outer faces of the bases so that the shaft will not slide therethrough.

It will be see that with the components of the actuating mechanism 41 arranged in the manner as described foregoing, and as shown in FIGURES 1, 3 and 4 of the drawings, the pressure of the spring outwardly against bases 56 and 57 of collar members 50 and 51, will tend to continually urge the collar members 50 and 51 to pivot on their pivotal axes as represented by pins and bolts 64 and 65 respectively in the direction shown by an arrow marked A in FIGURE 3.

Collar member 51 is coupled to the other end 68 of the rocker arm by a pair of U-shaped clevis members 70 and 71, the arms 72 of clevis member 71 being pivotally secured at their ends to the leg 54 of collar member 51 near the base 57 thereof by a pin or bolt 73 and the legs 74 of collar member 70 are secured in a like manner by a pin or bolt 76 to the other end 68 of the rocker arm 27. The bases 78 and 79 of the clevis members 70 and 71, respectively, as shown in FIGURE 6, are secured in spaced relationship to each other by a bolt 80 which passes through suitable apertures in each of said bases and which has nuts 82 threaded on each end thereof and bearing against the inner surface of said bases 78 and 79. The linkage thus effected between collar member 50 and rocker arm 27 is capable of longitudinal adjustment by positioning nuts 82 on bolt 80 in a manner hereinafter described.

The relationship of each of the components of the tilling unit as hereinbefore described with respect to relative size and position can be best explained with reference to the operation of the unit and with particular reference to FIGURES 3 and 4, which show the unit in which the digging tool 13 is in its retracted position and extended position, respectively. Referring to FIGURE 4, it will be seen that the digging tool 13 is extended outwardly by the pivotal action of the actuating mechanism operating through clevis members 70 and 71 to pivot rocker arm 27 on its pivotal axis until the latter is stopped by the stop surface 40 of the hub 16. In this position, the internal angle between collar member 51 and clevis member 71, is an acute angle greater than 45°, and the internal angle between rocker arm 27 and link members 33 is a little less than 180°. Pressure against the tooth portion 14 of the digging tool 13 in the direction as shown by the arrow marked P, will tend to cause the tooth member to rotate about its pivotal axis, which in turn through the action of the linking members 33 pivots the rocker arm on its pivotal axis, thereby causing the clevis members 70 and 71 to rotate collar member 51 on bolt 65. This latter movement will tend to rotate the shaft and collar 50 about the pivotal axis of the latter collar member, thereby bringing base 56 of the latter closer to the pivotal axis of collar member 50, thereby causing said collar member to slide along the shaft 45 against the action of the spring 44. Continued pressure against the digging tool 13 will result in the tool assuming a position as shown in FIGURE 3. In this latter figure, the internal angle between the rocker arm 27 and link member 33 is more or less acute and the internal angle between clevis member 71 and the leg 54 of collar member 51 is more or less obtuse, or greater than 90°.

The rotative movement of the collar members between their position as shown in FIGURE 3 and their position as shown in FIGURE 4 will result in very little movement of their bases towards each other, in fact a movement, the distance of which is approximately one half of that which their pivotal axes lie apart. Where the pivotal axes of said collar members are spaced relatively close together and their legs are relatively long, the movement of their bases towards each other is minimal relative to the length of the arc followed by said bases as they rotate between the aforesaid positions. To all intents and purposes therefore, and considering the extent of movement of the digging tool 13 as the latter moves between the positions as shown in FIGURES 3 and 4 and the gradually increasing mechanical advantage gained by the changing angular relationship between the rocker arm 27 and links 33, the increasing outward force of the spring, as it rotates between the said positions, can be discounted, and for all practical purposes may be considered to be a constant rate spring.

It will be seen, therefore, that as movement of the digging tool takes place between its extended position and retracted position, the compressive force of the spring transferred through collar member 51, clevis members 70 and 71, rocker arms 27 and link members 33, to the digging tool 13 has steadily decreased. In other words, the leverage of the digging tool as it moves from its extended to its retracted position against the spring has steadily increased whereby if the digging tool during its rotation around the shaft 10 should strike a relatively immovable object, the pressure exerted against the tool, causing it to rotate about its pivotal axis, would not by reason of the fact that the tool may move to its retracted position against lessening pressure tend to lift the whole unit upwardly.

In order to prevent damage to the tooth which might arise by reason of excessive pressure required to commence moving it from its extended position or, in certain instances, to prevent the tooth from so moving until the pressure does become excessive, the compressive force of the spring against base 56 of the collar member 50 may be adjusted by varying the distance between clevis members 70 and 71 which may be easily accomplished by adjusting the position of the nuts 82 on bolt 80. If, for example, we wish to increase the reaction of the digging tool 13 against a force tending to pivotally move said tool from its extended position, the bases 78 and 79 are drawn closer together by properly adjusting nuts 82 on bolts 80, to thereby cause collar member 51 to rotate on its pivotal axis. The rotational movement of the collar member 51 will result in a corresponding rotation of the shaft 45 and a corresponding decrease of the distance between bases 56 and 57 of said collar member 50 and collar member 51 thereby preloading the spring 44. It will, therefore, require additional pressure against the digging tool 13 to overcome the additional compressive force of the spring.

As has been mentioned previously, a plurality of tilling units 11 are usually carried on the shaft 10. In the preferred form, the tilling units are arranged on the shaft so that upon rotation thereof, the digging tools follow each other into the surface to be tilled in a consecutive order. Although any staggered arrangement may be used, it is preferred to arrange the units on the shaft so that the digging tools offer a helical line of advancement relative to the axis of the shaft.

In the specification foregoing, reference has been made to a digging tool which is arcuate in shape and has a tooth portion and shank portion. However, it is apparent that a tooth of any shape may be employed, and being shaped or formed to suit the particular circumstances and conditions relating to the use of the rotary tiller. In the present invention and in the preferred form, the digging tool, besides being arcuate in shape, has its tooth portion shaped as a broad wedge. This will enable the tiller to pull or comb such weeds as couch-grass from the soil to be eradicated rather than cutting them off. However, as indicated hereinbefore, the invention is not limited to any one digging tool of a particular size or shape.

I claim:

1. A rotary tiller comprising a rotatable shaft; a pair of arms extending in opposite radial directions from the shaft; a digging tool pivotally connected to one of the arms adjacent its end and swingable between a normal extended position to retracted positions rearwardly thereof; a pair of L-shaped collar members each having a base and a connecting leg pivotally secured adjacent the free ends of the legs to the other arm, on spaced pivotal axes, resilient means extending between the bases to urge the collar members to attempt to rotate to a normal linearly extended position; means linking one of the collar members to the digging tool adapted to swing the latter forwardly as the former attempts to move to its normal position, said means comprising a rocker arm pivotally mounted on said one arm, a first link member connecting one end of the rocker arm to the collar member to rotate the former in one direction as the latter rotate towards their normal position, a second link member connecting the other end of the rocker arm to the digging tool adapted to swing said tool forwardly as the rocker arm is moved in said one direction, said second link member and said rocker arm being arranged so that they co-operatively move from a folded position towards a linearly extended, dead centre position as the rocker arm rotates in said one direction to thereby gradually reduce the mechanical advantage of the tool against the action of the resilient means as said tool moves from a retracted to its normal position; and stop means engageable by the tool to limit forward swinging movement thereof as it reaches its normal position.

2. A rotary tiller as claimed in claim 1 in which the first link member is adjustable as to length.

3. A rotary tiller as claimed in claim 1 including a rod slidably secured to and extending between the bases of the collar members.

4. A rotary tiller comprising a rotatable shaft; a pair of arms extending in opposite radial directions from the shaft; a digging tool pivotally connected to one of the arms adjacent its end and swingable between a normal extended position to retracted positions rearwardly thereof; a pair of L-shaped collar members each having a base and a connecting leg pivotally secured adjacent the free ends of the legs to the other arm, on spaced pivotal axes, said bases having apertures formed therethrough; an elongated shaft slidably extending at each end through both apertures; a spring arranged over the shaft and reacting outwardly against the bases of the collar members to urge the latter to attempt to rotate to a normal linearly extended position; means linking one of the collar members to the digging tool being adapted to swing the latter forwardly as the former attempts to move to its normal position, said means comprising a rocker arm pivotally mounted on said one arm, a first link member connecting one end of the rocker arm to said one collar member to rotate the former in one direction as both collar members attempt to rotate towards their normal position, a second link member connecting the other end of the rocker arm to the digging tool being adapted to swing said tool forwardly as the rocker arm is moved in said one direction, said second link member and said rocker arm being arranged so that they co-operatively move from a folded position towards a linearly extended, dead centre position as the rocker arm rotates in said one direction to thereby gradually reduce the mechanical advantage of the tool against the action of the spring as said tool moves from a retracted to its normal position; and stop means engageable by the tool to limit forward swinging movement thereof as it reaches its normal position.

5. A rotary tiller as claimed in claim 4 in which the first link member comprises a pair of U-shaped clevis members having apertures formed through their bases and including a bolt extending through the apertures, said bolt having nuts threaded over each end bearing against the inner surfaces of said bases.

6. A rotary tiller comprising a rotatable member, a digging tool pivotally connected to the rotatable member and swingable between a normal radially extending position and a retracted position rearwardly therefrom, a pair of spaced opposed collar members, each pivotally connected to the rotatable member on spaced pivotal axes, said collar members adapted when moved about their pivotal axes to vary the linear distance therebetween, a shaft slidably carried by the collar members to rotate the latter, a compression spring carried by the shaft between the collars to urge the collars to rotate to a normal linearly extended position, an elongated rocker arm pivotally secured intermediate its ends to the rotatable member, linking means linking one end of the rocker arm to the tool to pivotally move said rocker arm in response to pivotal movements of the tool, said linking means being arranged to pivot the rocker arm in diminishing incremental movements for constant incremental rearwardly pivotal movements of the tool, and a connector pivotally connecting the other end of the rocker arm to one of the collar members to rotate both said collar members out of their normal position against the action of the spring when the tool is swung rearwardly from its normal position, the spring thereby offering diminishing resistance to movements of the tool as the latter is swung rearwardly from its normal position, said connector comprising a pair of U-shaped clevis members, one being connected to the collar member and the other to the rocker arm, and being adjustably interconnected by adjustable bolt means whereby the collar members may be rotatably positioned relative to the tool when the latter lies in its normal position to thereby selectively preload the spring to thereby selectively vary the resistive action of the spring to rearward pivotal movement of the tool from its normal position, and stop means formed on the rocker arm to engage the tool to limit forward swinging travel of the latter.

References Cited by the Examiner

UNITED STATES PATENTS

| | | | |
|---|---|---|---|
| 310,821 | 1/85 | Hench et al. | 172—266 |
| 554,928 | 2/96 | Ham | 172—267 |
| 1,034,474 | 8/12 | Martin | 172—266 |
| 1,210,901 | 1/17 | Carraway | 172—266 |
| 1,951,701 | 3/34 | Major | 172—544 |

FOREIGN PATENTS 635,406   1/62   Canada.

ABRAHAM G. STONE, *Primary Examiner.*